3,548,026
COATING COMPOSITION CONTAINING EPOXY RESINS AND CARBOXYL TERMINATED POLYESTERS
Joseph Weisfeld, Fair Lawn, Alfred M. Tringali, Parsippany, Joseph F. Ackerman, Cedar Grove, and Joseph J. Bernardo, Lodi, N.J., assignors to Inmont Corporation, New York, N.Y., a corporation of Ohio
No Drawing. Filed Mar. 5, 1968, Ser. No. 710,656
Int. Cl. C08g *39/10, 45/14;* C09d *3/66*
U.S. Cl. 260—835          3 Claims

ABSTRACT OF THE DISCLOSURE

A coating composition consisting essentially of an epoxy resin and a novel polyester having a terminal carboxyl functionality greater than 2 comprising the esterification product of (1) a hydroxy terminated polyester and (2) a carboxylic acid containing mono-anhydride composition selected from the group consisting of (a) trimellitic anhydride, (b) the reaction product obtained by the reaction of trimellitic anhydride with a 1,2-monoepoxy compound, and (c) the addition reaction product of maleic anhydride with an unsaturated fatty acid.

---

This invention relates to coating compositions comprising blends of epoxy resins and carboxyl terminated polyesters. The invention further relates to novel flexible, tough coatings of these blends which can be used on metals which are extensively worked and fabricated such as screw bottle caps, flexible coils and aluminum siding. Fabrication of the coated metals does not affect the properties or the integrity of the coatings of this invention.

Epoxy resin coatings have many highly desirable properties required for metal coatings for bottle caps such as screw tops. Such coatings are hard, tough, adherent to metals, abrasion resistant and resistant to virtually all foods and solvents to which bottle cap coatings would be subjected. However, the one major drawback to the use of epoxy resins in bottle cap coatings has been the lack of sufficient flexibility to maintain adequate adhesion to the metal substrate during the various processes involved in fabricating bottle caps such as knurling, bending at very severe angles and screw threading, without cracking.

We have now developed a novel blend containing epoxy resins which provides coatings in which the flexibility deficiency is eliminated while all of the other desirable properties are retained.

The coating compositions of our invention comprise an organic solvent solution of an epoxy resin blended with a linear polyester having a terminal carboxyl functionality of more than two. By this we mean straight chain, substantially unbranched polyesters having more than two carboxyl groups per molecule attached to the chain ends. Furthermore, it is preferable that the polyesters be substantially free of nonterminal carboxyl groups.

The carboxyl terminated polyesters employed in the blends of this invention are the esterification product of (1) a preformed polyester, derived from a dicarboxylic acid with a stoichiometric excess of a diol; this prepolyester is substantially hydroxyl terminated with little or no terminal carboxyl groups and (2) a reactive component containing one anhydride group and at least one carboxylic acid group selected from the class of trimellitic anhydride, the reaction product of trimellitic anhydride with a monoepoxide, and the reaction product of maleic anhydride with an unsaturated fatty acid.

The use of a carboxylic acid containing anhydride component is critical to the practice of this invention. Its use makes possible the formation of linear polyesters having a terminal carboxyl functionality of more than two.

Let us consider why such properties are necessary. If a carboxyl terminated linear polyester were produced by the esterification of diols and only dicarboxylic acids or their anhydrides, the resulting linear polyester could obviously only have a maximum of two terminal carboxyl groups per molecule. Such polyesters when blended with the epoxy resins were found to give coatings which were less tough and had a lower abrasion and solvent resistance than the blends of this invention. On the other hand, if a carboxyl terminated polyester were produced by the esterification of a triol or higher polyol with a dicarboxylic acid or its anhydride, the resulting polyester could have more than two terminal carboxyl groups per molecule but would be non-linear. Such polyesters when blended with the epoxy resins were found to give coatings which were deficient in the degree of flexibility required for the coating to withstand during fabrication of screw tops or bottle caps.

If a tricarboxylic acid which did not contain an anhydride group, for example, trimellitic acid, were used, a linear carboxyl-terminated polyester giving the properties of the compositions of this invention could not be produced. The three carboxylic acid groups on the trimellitic acid are substantially equally reactive, and require a higher temperature to esterify with hydroxyl groups than the carboxylic acid-containing monoanhydrides of this invention. Thus, even if trimellitic acid in place of a carboxylic acid-containing anhydride was esterified with a hydroxyl terminated prepolyester formed from a dicarboxylic acid and an excess of diol, the higher esterification temperature would produce a non-linear extensively cross-linked structure with all three carboxyl groups participating in the cross-linking esterification. Such polyester when blended with the epoxy resins would likewise give coatings which were deficient in the high degree of flexibility required for the coating to the metal surface during fabrication of screw tops and bottle caps.

The prepolyesters operable in the present invention are linear polyesters derived from a dicarboxylic acid and a diol. This prepolyester is substantially hydroxyl-terminated with little or no carboxyl groups and has a molecular weight range from 2,000 to 10,000. In order to achieve the hydroxyl termination in the prepolyester, a stoichiometric excess of the diol is used over the dicarboxylic acid, preferably from 1.02 to 1.20 moles of diol being used for each mole of dicarboxylic acid.

Although the hydroxyl-terminated polyesters of the present invention were prepared by the direct esterification of hydroxyl groups with carboxylic acid groups, other polyesterification procedures, such as transesterification and double decomposition, may be employed.

Among suitable diols that can be used in the formation of the prepolyester are any of the conventional diols such as ethylene glycol, propylene glycol, butylene glycol, neopentyl glycol, 1,5-pentanediol, 1,6-hexanediol. Also suitable are the ether diols such as diethylene glycol, dipropylene glycol, triethylene glycol, tetraethylene glycol, polyethylene glycol, polybutylene glycols.

Illustrative of suitable dicarboxylic acids which can be employed in preparing the prepolyester are aromatic acids such as phthalic acid, isophthalic acid, terephthalic acid; aliphatic acids such as succinic acid, glutaric acid, adipic acid, pimelic acid, suberic acid, azelaic acid, sebacic acid; unsaturated dicarboxylic acids such as maleic acid, fumaric acid as well as anhydrides of these acids. Mixtures of the above acids are also operable.

One carboxylic acid containing monoanhydride operable in preparing the carboxyl terminated polyesters of this invention is trimellitic anhydride. When trimellitic anhydride is reacted with a substantially hydroxyl-terminated prepolyester at a temperture below 175° C., the free carboxyl group of the carboxyl-containing anhydride does not undergo esterification. Only the anhydride group reacts forming an esterification linkage with a terminal hydroxyl group at the prepolyester chain end and further forming a second unreacted carboxyl group at the chain end. Since the temperature is too low for the carboxyl groups to undergo further esterification, there are two terminal carboxyl groups for each molecule of trimellitic anhydride reacted with the hydroxyl terminated prepolyester. With two terminal hydroxyl groups on the prepolyester molecule, a maximum of four terminal carboxyl groups on the final polyester molecule is possible when trimellitic anhydride alone is esterified with the hydroxyl terminated prepolyester. When the monoanhydride composition which is esterified with the hydroxyl-terminated prepolyester is a mixture of the trimellitic anhydride and an anhydride of a dicarboxylic acid, the number of terminal carboxyl groups in the resulting polyester molecule will vary from more than 2 up to 4 depending on the proportions of the trimellitic and dicarboxylic acid anhydrides used. One equivalent weight of the monoanhydride composition based upon anhydride group content is reacted with each equivalent weight of the prepolyester based upon hydroxyl content.

The number of terminal carboxyl groups per molecule of the linear carboxyl-terminated polyester which may also be referred to as the terminal carboxyl functionality of the polyester may be calculated in accordance with the following formula:

$$F_t = Af_a + B + C$$

where:

[1] $F_t$=terminal carboxyl functionality of the final polyester.
A=number equivalents of polyacid mono-anhydride/mole prepolymer.
$f_a$=number free carboxylic groups +1 of polyacid monoanhydride.
B=number equivalents of mono-anhydride e.g. phthalic, maleic anhydride/mole of prepolymer.
C=number of equivalents of free carboxylic groups in prepolymer/mole prepolymer.

[1] A+B=2−C.

As we have previously set forth while the prepolyester is preferably substantially hydroxyl-terminated, the composition of this invention would be operable even if the prepolyester had some terminal carboxyl groups. Therefore the carboxyl functionality of the prepolyester should be determined in the conventional manner.

It should be noted that if in place of trimellitic anhydride there is used a polyanhydride, i.e., an anhydride with more than one anhydride group such pyromellitic anhydride, the product of esterification with the hydroxyl terminated prepolyester is a polyester with terminal anhydride groups and carboxyl groups which are not terminal but positioned along the chain. Such a polyester when blended with the epoxy resins would given coatings which were deficient in the high degree of flexibility required for the coating to adhere to the metal surface during the fabrication of screw caps, etc.

Another class of carboxylic acid containing anhydrides operable in preparing the carboxyl-terminated polyesters of the invention is the reaction product of trimellitic anhydride and a monoepoxide. The substantially hydroxyl-terminated prepolyester is reacted with the trimellitic anhydrides:monoepoxide reaction product at a temperature below 190° C. At this temperature, the carboxylic acid groups on the reaction product do not react. Only the anhydride group reacts forming an esterification linkage with a terminal hydroxyl group at the prepolyester chain end.

In the preparation of the reaction product of the trimellitic anhydride and monoepoxide, preferably 2 moles of trimellitic anhydride are reacted with 1 mole of monoepoxide having a 1,2-epoxy group. This yields a monoanhydride having the probable structure

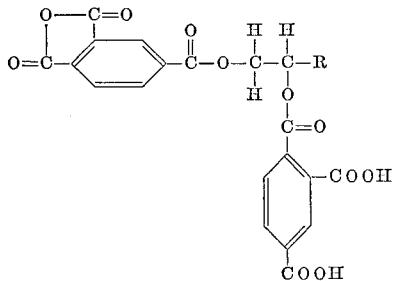

where R represents the remainder of the monoepoxide other than the 1,2-epoxy group.

Typical monoepoxide compounds which can be employed in preparing the carboxylic acid containing monoanhydrides include ethylene oxide, propylene oxide, 1,2-butylene oxide, styrene oxide, glycidyl ethers of aliphatic alcohols and glycidyl esters of lower aliphatic acids.

Accordingly, when the monoanhydrides of this invention are reacted with hydroxyl-terminated prepolyesters at a temperature below 190° C., only the anhydride group reacts with a terminal hydroxyl group on the prepolyester forming an esterification linkage and further forming a carboxyl group. Since, as seen from the structure of the monoanhydride, the compound initially has 2 carboxyl groups, the additional carboxyl group makes a total of 3 carboxyl groups for each equivalent weight of the monoanhydride (based upon anhydride group content) reacted with the prepolyester. Since there are two terminal hydroxyl groups on the prepolyester molecule, a maximum of six carboxyl groups on the final polyester molecule is possible when said epoxide/trimellitic anhydride product is esterified with the hydroxyl terminated prepolyester. When the monoanhydride composition which is esterified with the hydroxyl-terminated prepolyester is a mixture of the epoxide/trimellitic anhydride product and an anhydride of a dicarboxylic acid, the number of terminal carboxyl groups in the resulting polyester molecule will vary from more than two to six depending on the proportions of the epoxy/trimellitic anhydride product and dicarboxylic acid and anhydrides used. One equivalent weight of the monoanhydride composition based upon anhydride group content is reacted with each equivalent weight of the prepolyester based upon hydroxyl content.

Another type of carboxylic acid containing monoanhydride composition operable in preparing the carboxyl-terminated polyesters of this invention includes the reaction product of a maleic anhydride with unsaturated fatty acids. The substantially hydroxyl-terminated prepolyester is reacted with the maleic anhydride:unsaturated fatty acid adduct at a temperature below 175° C. At this temperature, only the anhydride group reacts forming an esterification linkage with a terminal hydroxyl group at the prepolyester chain end and the free carboxyl group does not participate in the esterification reaction.

In the preparation of the reaction product of maleic anhydride and unsaturated fatty acid, preferably 1 mole of maleic anhydride is reacted with 1 mole of unsaturated fatty acid. The unsaturated fatty acids which are operable are $C_{10}$–$C_{20}$ and include decylenic acid, undecylenic acid, dodecylenic acid, palmitoleic acid, oleic acid, linoleic acid, linolenic acid and eleostearic acid, fatty acids derived from rosin, tall oil and vegetable oil.

The maleic acid fatty acid adduct contains a free carboxyl group derived from the unsaturated fatty acid portion and the anhydride group from the maleic anhydride component. Accordingly, when this adduct is reacted with the polyester at a temperature below 175° C., only the anhydride group reacts with terminal hydroxyl group on the prepolyester forming an esterification linkage and further forming a carboxyl group. Since the adduct contains one carboxyl group, the additional carboxyl group makes a total of 2 carboxyl groups for each equivalent weight of the monoanhydride (based upon anhydride group content) reacted with the prepolyester. Since there are 2 terminal hydroxyl groups on the prepolyester molecule, a maximum of four carboxyl groups on the final polyester molecule is possible when said unsaturated fatty acid/maleic anhydride adduct is esterified with the hydroxyl terminated prepolyester. When the monoanhydride composition which is esterified with the hydroxyl terminated prepolyester is a mixture of the unsaturated fatty acid/maleic anhydride adduct and an anhydride of a dicarboxylic acid, the number of terminal carboxylic groups in the resulting polyester molecule will vary from more than 2 up to 4 depending on the proportions of the adduct and dicarboxylic acid anhydrides used. One equivalent weight of the monoanhydride composition based upon anhydride group content is reacted with each equivalent weight of the prepolyester based upon hydroxyl content.

With respect to the monoanhydride composition which reacts with the hydroxyl-terminated prepolyester, while phthalic anhydride and dodecenylsuccinic anhydride were used for illustration in combination with the carboxylic acid containing monoanhydride, other anhydrides of dicarboxylic acids may be used such as succinic anhydride, glutaric anhydride, maleic anhydride, dichloromaleic anhydride, itaconic anhydride, tetrahydrophthalic anhydride, tetrabromophthalic anhydride, tetrachlorophthalic anhydride hexahydrophthalic anhydride, other alkyl and alkenyl succinic anhydrides such as octyl succinic anhydride, decyl succinic anhydride, tetradecenyl succinic anhydride, hexadecenyl succinic anhydride. octadecenyl succinic anhydride. For best results in the blends of this invention, it is preferred that when an anhydride of a dicarboxylic acid is used in combination with the carboxylic acid containing monoanhydride, the proportion of the anhydride be such that the resulting carboxyl terminated polyester has a functionality of from 2.05 to 6.0.

The epoxy resins or polyepoxides used in this invention are preferably resins produced by the reaction of a polyhydric phenol, particularly p,p'-dihydroxydiphenyl dimethylmethane with epichlorohydrin in accordance with the procedure of U.S. Pat. No. 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of p,p'-dihydroxydiphenyl dimethylmethane, a higher weight polyepoxide resin may be produced. The polyepoxide resins produced by the reaction of epichlorohydrin and p,p'-dihydroxydiphenyl dimethylmethane may in addition be esterified with vegetable oil fatty acids including coconut acids, cottonseed acids, dehydrated castor fatty acids, linseed oil fatty acids, oiticica fatty acids, soy acids and tung fatty acids.

Other polyepoxides which may be used in the practice of this invention are the epoxidized esters of polyethylenically unsaturated monocarboxylic acids such as epoxidized linseed, soybean and dehydrated castor oil.

Diglycidyl esters of dibasic acids as adipic, azelaic, sebacic, phthalic, hexahydrophthalic acid may also be used.

Another group of epoxy-containing materials which may be used includes the epoxidized esters of unsaturated monohydric alcohols and polycarboxylic acids, e.g., di-(2,3-epoxybutyl) adipate or di-(2,3'-epoxyhexyl) succinate.

Another group includes epoxidized derivatives of polyethylenically unsaturated polycarboxylic acids such as, for example, dimethyl 8,9,12,13-diepoxyeicosanedioate or dibutyl 7,8,11,12-diepoxyoctadecanedioate.

Also operable are the epoxidized polyethylenically unsaturated hydrocarbons such as epoxidized 2,2-bis (2-cyclohexanyl) propane or epoxidized vinyl cyclohexane.

Epoxidized novolacs prepared by reacting epichlorohydrin with phenol-formaldehyde novolac resins are also applicable in the practice of this invention.

The coating compositions of this invention comprise blends of carboxyl terminated polyesters and epoxy resins in volatile organic solvents. Illustrative of the solvents which may be employed are ketones, such as methyl ethyl ketone, isophorone, mesityl oxide; substituted glycols such as ethylene glycol monomethyl ether, ethylene glycol monomethyl ether acetate, ethylene glycol monoethyl acetate, diethylene glycol monoethyl ether acetate, diethylene glycol monobutyl ether acetate, glycol diacetate, as well as benzyl alcohol, p-dioxane, 2-nitropropane, bis(2-methoxyethyl) ether, and chlorobenzene. While the coating composition may be made up entirely of the previously described solvents and resin components, it may be desirable to replace some of the above-mentioned solvents with less expensive materials to reduce the cost of the final coating composition. Illustrative of the less expensive solvents which may be employed are toluene, xylene as well as other high boiling aromatic petroleum fractions.

Preferably from 0.5 to 2.0 equivalents of epoxy material are blended with each part of carboxyl terminated polyester.

The blend of the carboxyl terminated polyester and epoxy resins preferably contains as a catalyst, a metal salt of an organic acid such as metal acetates, octoates, oleates or naphthenates. The metal may be cobalt, chromium, manganese, nickel and zinc.

In accordance with another aspect of the present invention, it has been found that the rate of curing may be enhanced by blending with the compositions of this invention, an amine-aldehyde resin as a third component. The amine-aldehyde resin which must be compatible with the other two components is preferably a melamine-formaldehyde resin including triazine-formaldehyde resins such as the hexamethyl ether of hexamethylol melamine which is most preferable. The melamine-formaldehyde resin also yields a coating of enhanced solvent resistance.

The following examples will illustrate the practice of this invention:

EXAMPLE 1

353 g. diethylene glycol and 498 g. isophthalic acid (mole ratio 10:9) are heated under a nitrogen atmosphere at 240 to 245° C. for 3 to 4 hours as a solution in 20 g. xylene. The water given off is removed by azeotropic distillation. The reaction is continued at the same temperature for a total of 28 hours. The prepolyester formed has a hydroxyl number of 24.4, an acid number of 5.0 and a molecular weight of 5730.

Then the following are reacted at 150° C. for about three hours:

| | Parts | Equivalents |
|---|---|---|
| Above prepolyester | 5,730 | 1.86 equivalent weights based upon hydroxyl content. |
| Phthalic anhydride | 234 | 1.58 equivalent weights based upon anhydride group content. |
| Trimellitic anhydride | 53.8 | 0.28 equivalent weight based upon anhydride group content. |

The resulting polyester has a terminal carboxyl functionality of 2.28.

Then, 85.5 g. of the resulting polyester are dissolved in 85.5 g. of a 1:1 mixture of xylene and ethylene glycol monoethyl ether acetate.

Then 85.5 g. of TiO$_2$ pigment are added as well as 14.5 g. of Epon 1001 (an epoxy resin formed by the reaction of p,p'-dihydroxylphenyl dimethylmethane and epichlorohydrin having an average molecular weight of about 900 and an epoxide equivalent between 450–550). Using a zinc octane catalyst (6% based upon the polyester content) a mixture is prepared.

The resulting solution is coated onto tinplate and dried to a thickness of 0.7 mil by curing at 400° F. for 12 minutes. A circular disc is cut from the cured coated tinplate and fabricated into a screw bottle cap by knurling and threading. The resulting bottle cap coating displays excellent adhesion, excellent flexibility and resistance to fracturing on being fabricated. This is evidenced by the following test: the cap is submerged for five minutes in an aqueous solution containing 200 g. CuSO$_4$, 200 ml. glacial acetic acid and 200 ml. of 12 N HCl per liter. Fractures or discontinuities show up as rust spots or lines. Such fractures were completely absent.

The coated bottle cap displays good steam processing resistance. Steam processing resistance is determined by contacting the coating with steam at 250° F. Films prepared in the above example withstood 30 minutes' contact without showing any appreciable discontinuity of film or film blush.

EXAMPLE 2

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Adipic acid | 4.5 | 657 |
| Isophthalic acid | 4.5 | 747 |
| Ethylene glycol | 5.0 | 310 |
| Diethylene glycol | 5.0 | 530 |

The prepolyester formed has a hydroxyl number of 18.3, an acid number of 0.9 and a molecular weight of 5860.

STEP 2

| Carboxyl terminated polyester | Equivalents | Parts |
| --- | --- | --- |
| Above prepolyester | 1.91 | 5,860 |
| Phthalic anhydride | 0.78 | 115 |
| Trimellitic anhydride | 1.13 | 217 |

The polyester has a terminal carboxyl functionality of 3.13.

The resulting coating has the same desirable properties as does the coating of Example 1.

EXAMPLE 3

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Phthalic anhydride | 9 | 2,977 |
| Ethylene glycol | 10 | 1,385 |

The prepolyester formed has a hydroxyl number of 17.0, an acid number of 3.3 and a molecular weight of 5570.

STEP 2

| Carboxyl terminated polyester | Equivalents | Part |
| --- | --- | --- |
| Above prepolyester | 1.66 | 5,570 |
| Phthalic anhydride | 1.363 | 202 |
| Trimellitic anhydride | 0.297 | 57 |

The polyester has a terminal carboxyl functionality of 2.30.

The resulting coating has the same desirable properties as does the coating of Example 1.

EXAMPLE 4

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Terephthalic acid | 13.5 | 2,241 |
| Diethylene glycol | 15 | 1,590 |

The prepolyester formed has a hydroxyl number of 13.5, an acid number of 1.9 and a molecular weight of 6897.

STEP 2

| Carboxyl Terminated Polyester | Equivalents | Parts |
| --- | --- | --- |
| Above prepolyester | 1.78 | 7,260 |
| Trimellitic anhydride | 1.78 | 342 |

The polyester has a terminal carboxyl functionality of 3.78.

The resulting coating has the same desirable properties as does the coating of Example 1.

EXAMPLE 5

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Isophthalic acid | 9 | 1,494 |
| Diethylene glycol | 5 | 530 |
| Neopentyl glycol | 5 | 520 |

The prepolyester formed has a hydroxyl number of 10.1, an acid number of 4.4 and a molecular weight of 7720.

STEP 2

| Carboxyl terminated polyester | Equivalents | Parts |
| --- | --- | --- |
| Above prepolyester | 1.50 | 7,720 |
| Phthalic anhydride | 1.17 | 173 |
| Trimellitic anhydride | 0.33 | 64.8 |

The polyester has a terminal carboxyl functionality of 2.33.

The resulting coating has the same desirable properties as does the coating of Example 1.

EXAMPLE 6

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Sebacic acid | 9 | 1,342 |
| Dipropylene glycol | 10 | 1,820 |

The prepolyester formed has a hydroxyl number of 23.3, an acid number of 0.6 and a molecular weight of 4650.

STEP 2

| Carboxyl terminated polyester | Equivalents | Parts |
| --- | --- | --- |
| Above prepolyester | 1.75 | 4,650 |
| Phthalic anhydride | 1.54 | 228 |
| Trimellitic anhydride | 0.21 | 40.3 |

The polyester has a terminal carboxyl functionality of 2.21.

The resulting coating has the same desirable properties as does the coating of Example 1.

EXAMPLE 7

Example 1 is repeated using the same conditions, procedure, proportions and ingredients except that the carboxyl terminated polyester is prepared by the procedure of Example 1 from the following components:

STEP 1

| Prepolyester | Moles | Parts |
| --- | --- | --- |
| Isophthalic acid | 0.475 | 139.3 |
| Phthalic anhydride | 0.475 | 123.7 |
| Diethylene glycol | 1.0 | 186.5 |

The prepolyester formed has a hydroxyl number of 24.5, an acid number of 1.7 and a molecular weight of 4290.

STEP 2

| Carboxyl terminated polyester | Equivalents | Parts |
|---|---|---|
| Above prepolyester | 1.71 | 4,075 |
| Trimellitic anhydride | 0.78 | 150 |
| Dodecenyl succinic anhydride | 0.93 | 247 |

The polyester has a terminal carboxyl functionality of 2.78.

The resulting coating has the same desirable properties as does the coating of Example 1. In addition, even when the pigment content of the coating is greatly reduced or when the pigment is removed, there is no tendency for forming pinholes. The coated film remains smooth and continuous. This contrasts to the coating of Example 1 wherein there is some tendency toward pinholes when the pigment is reduced or removed.

EXAMPLE 8

Example 1 is repeated using the same conditions, procedure, proportions and ingredients except that the carboxyl terminated polyester is prepared by the procedure of Example 1 from the following components:

STEP 1

| Prepolyester | Moles | Parts |
|---|---|---|
| Isophthalic acid | 4.5 | 747 |
| Phthalic anhydride | 4.5 | 666 |
| Ethylene glycol | 5.0 | 310 |
| Diethylene glycol | 5.0 | 530 |

The prepolyester formed has hydroxyl number of 14.2, an acid number of 0.7 and a molecular weight of 7550.

STEP 2

| Carboxyl terminated polyester | Equivalents | Parts |
|---|---|---|
| Above polyester | 1.90 | 7,550 |
| Phthalic anhydride | 1.57 | 232.5 |
| Trimellitic anhydride | 0.33 | 63.2 |

The polyester has a terminal carboxyl functionality of 2.33.

The resulting coating has the same desirable properties as does the coating of Example 1.

EXAMPLE 9

Example 1 is repeated using the same procedure, conditions, ingredients and proportions except that in place of Epon 1001, there is used Epon 828 (an epoxy resin formed by the reaction of p,p'-dihydroxyldiphenyl dimethylmethane and epichlorohydrin having an average molecular weight of about 380 and an epoxide equivalent of between 185–192). The resulting coating has the same desirable properties as does the coating of Example 1.

EXAMPLE 10

Example 1 is repeated using the same procedure, conditions, ingredients and proportions except that in place of Epon 1001, there is used Epoxol 7-4 (epoxidized soya bean oil having an oxirane content of 7%).

The resulting coating has the same desirable properties as does the coating of Example 1.

EXAMPLE 11

Example 1 is repeated using the same procedure, conditions, ingredients and proportions except that there is used Epon 154 (an epoxy novolac type resin having an epoxide equivalent between 176–181). The resulting coating has the same desirable properties as does the coating of Example 1.

EXAMPLE 12

Example 1 is repeated using the same procedure, conditions, ingredients and proportions except there is used Unox 201 (3,4-epoxy-6-methylcyclohexylmethyl 3,4,6-methylcyclohexane carboxylate). The resulting coating has the same desirable properties as does the coating of Example 1.

EXAMPLE 13

Example 1 is repeated using the same procedure, conditions, ingredients and proportions except that in the blend of Epon 1001 and carboxyl terminated polyester, there is also blended an additional 10 parts of the hexamethyl ester of hexamethylol melamine. The resulting coating displays the same desirable properties of the coating of Example 1 but in addition has a faster curing rate in the order of 3 minutes at 400° F. and appears to have improved solvent resistance.

EXAMPLE 14

384 g. (2 moles) of trimellitic anhydride are reacted with 143 g. (1 mole) butyl glycidyl ether in the presence of 28 g. dioxane and 1.6 g. dimethyl benzylamine by heating over a period of 1½ hours during which time the temperature is slowly raised from 45° C. to 115° C. under reflux and an inert atmosphere. The mixture is then maintained at this temperature until an acid value of over 400 is obtained. The volatiles are then removed by vacuum distillation at 165–175° C.

1060 g. diethylene glycol, 703 g. phthalic anhydride and 792 g. isophthalic acid (molar ratios 10:4.75:4.75) are heated under a nitrogen atmosphere at 240 to 245° C. for 3 to 4 hours as a solution in 69 g. xylene. The water given off is removed by azeotropic distillation. The reaction is continued at the same temperature for a total of about 24 hours. The resulting polyester has a molecular weight of about 8120, OH of 0.20 percent and an acid number of 3.6.

The carboxyl terminated polyester is prepared heating 609 g. of the above prepolyester and 79 g. of the trimellitic anhydride:butyl glycidyl ether reaction product for 3 hours at about 188° C. The acid number of the resulting polyester is 42. The carboxyl equivalent weight is calculated to be about 1340. There are approximately 6 terminal carboxyl groups per molecule.

Then, 84.5 g. of the resulting polyester are dissolved in 84.5 g. of a 1:1 mixture of xylene and ethylene glycol monoethyl ether acetate.

Then 85.5 g. of $TiO_2$ pigment are added as well as 15.5 g. of Epon 1001. Using 3.5 gms. of zinc octoate catalyst (16% based on metal content) a mixture is prepared.

The resulting solution is coated onto tinplate and dried to a thickness of 0.7 ml by curing at 400° F. for 12 minutes. A circular disc is cut from the cured tinplate and fabricated into a screw bottle cap by knurling and threading. The resulting bottle cap coating displays excellent adhesion, excellent flexibility and resistance to fracturing on being fabricated. This is evidenced by the following test: the cap is submerged for five minutes in an aqueous solution containing 200 g. $CuSO_4$, 200 ml. glacial acetic acid and 200 ml. of 12 N HCl per liter. Fractures or discontinuities show up as rust spots or lines. Such fractures were completely absent.

The coated bottle cap displays good steam processing resistance. Steam processing resistance is determined by contacting the coating with steam at 250° F. Films prepared in the above example withstood 30 minutes' contact without showing any appreciable discontinuity of film or film blush.

EXAMPLE 15

Example 14 is repeated using the same conditions, procedure, proportions and ingredients except that one mole of propylene oxide is used in place of the butyl glycidyl ether to prepare the trimellitic anhydride:monoepoxide reaction product. Then two moles of the above product are reacted with the prepolyester of Example 14.

The resulting blend of Epon resin and carboxyl terminated polyester has the same desirable properties as does the blend of Example 14.

EXAMPLE 16

Example 14 is repeated using the same conditions, procedure, proportions and ingredients except that one mole of styrene oxide is used in place of the butyl glycidyl ether to prepare the trimellitic anhydride:monoepoxide reaction product. Then two moles of the above product are reacted with the prepolyester of Example 14.

The resulting blend of Epon resin and carboxyl terminated polyester has the same desirable properties as does the blend of Example 14.

EXAMPLE 17

Example 14 is repeated using the same conditions, procedure, proportions and ingredients except that one mole of 1,2-butylene oxide is used in place of the butyl glycidyl ether to prepare the trimellitic anhydride:monoepoxide reaction product. Then two moles of the above product is reacted with the prepolyester of Example 14. The resulting blend of Epon resin and carboxyl terminated polyester has the same desirable properties as does the blend of Example 14.

EXAMPLE 18

Example 14 is repeated using the same conditions, procedure, proportions and ingredients except that one mole of Epoxide 7 (glycidyl ether of the formula

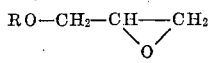

where R is primarily n-octyl or n-decyl containing 7% oxirane oxygen) is used in place of the butyl glycidyl ether to prepare the trimellitic anhydride:monoepoxide reaction product. Then two moles of the above product are reacted with the prepolyester of Example 14.

The resulting blend of Epon resin and carboxyl terminated polyester has the same desirable properties as does the blend of Example 14.

EXAMPLE 19

85 g. (0.853 mole) of maleic anhydride are reacted with 230 g. (0.714 mole) of oleic acid by heating for three hours at 215–230° C. in an inert atmosphere. The resulting adduct has an aqueous acid number of 396 and an alcoholic acid number of 282.

The oleic acid-maleic anhydride adduct 389 g. (0.79 equivalent) is reacted with 4075 g. (1.69 hydroxyl equivalents) of the hydroxyl terminated prepolyester of Example 7 and 133 g. (0.9 equivalent) phthalic anhydride in 1102 g. aromatic solvent. The mixture is heated at 145–150° C. for three hours in an inert atmosphere and then cooled to 90° C. and 1222 g. ethylene glycol monoethyl ether acetate added. The product has an acid number of 30.9.

Then 195.1 g. of the above carboxyl terminated polyester are dissolved in 95 g. ethylene glycol monoethyl ether acetate.

Then 150.2 g. of $TiO_2$ pigment are added as well as 21.1 g. of Epon 828. To this mixture is added 14.8 g. of the hexamethyl ether of hexamethylol melamine and 6.5 g. of 16% zinc octoate.

The resulting solution is coated onto Alodine 1200-S surface-treated aluminum panels and dried to a thickness of 1 mil by curing at 500° F.

EXAMPLE 20

310 g. (1 mole) of wood rosin are heated to 190° C. and 98 g. (1 mole) of maleic anhydride are added. The mixture is heated at 200° C. for 3 hours under a nitrogen atmosphere and the product poured while hot into pans and allowed to cool. The rosin-maleic anhydride adduct has an aqueous acid number of 377 and an alcoholic acid number of 260.

The same procedure is employed as in Example 19 for preparing the carboxyl terminated polyester except the following proportions are used:

| Carboxyl terminated polyester | Equivalents | Parts |
|---|---|---|
| Prepolyester of Example 7 | 1.69 | 4,075 |
| Rosin-maleic anhydride adduct | 0.81 | 350 |
| Dodecenylsuccinic anhydride | 10.88 | 233 |
| Aromatic solvent | | 1,102 |

The carboxyl terminated polyester has an acid number of 27.6.

The resulting coating has the same desirable properties as does the coating of Example 19.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A coating composition capable of forming a flexible coating when deposited on a surface and cured consisting essentially of an organic solvent solution of:
  (A) 0.5 to 2.0 equivalent weights of an epoxide resin having an epoxide equivalent between 176 and 550, and
  (B) 1.0 equivalent weight of a carboxyl terminated polyester having about 6 terminal carboxyl groups per molecule comprising the reaction product of:
    (a) an excess of the reaction product of an excess of a tricarboxylic anhydride with a material selected from the group consisting of butyl glycidyl ether, propylene oxide, styrene oxide, 1,2 butylene oxide, or glycidyl ether of the formula

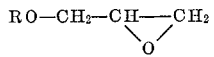

where R is n-octyl or n-decyl, with
  (b) a prepolyester having a molecular weight of 2,000–10,000 formed by reacting an excess of a glycol with dicarboxylic acid or anhydride.

2. The coating composition of claim 1 wherein said material is butyl glycidyl ether, the tricarboxylic anhydride is trimellitic acid anhydride, the glycol is diethylene glycol and the dicarboxylic acid or anhydride is a mixture of phthalic anhydride and isophthalic acid.

3. The coating composition of claim 2 wherein the mole ratio of trimellitic anhydride to butyl glycidyl ether is about 2:1 and the mole ratio of the reaction product of (a) to the prepolyester is about 2:1.

References Cited
UNITED STATES PATENTS

| | | | |
|---|---|---|---|
| 3,098,059 | 7/1963 | Van Strien et al. | 260—75 |
| 3,128,260 | 4/1964 | Langstroth | 260—22 |
| 3,196,119 | 7/1965 | Boller et al. | 260—22 |
| 3,218,274 | 11/1965 | Boller et al. | 260—22 |
| 3,268,477 | 8/1966 | Mueller | 260—835 |
| 3,268,483 | 8/1966 | Klootwijk et al. | 260—75 |
| 3,328,325 | 6/1967 | Zdanowski | 260—22 |
| 3,340,212 | 9/1967 | Tomita | 260—22 |
| 3,397,254 | 8/1968 | Wynstra et al. | 260—835 |

DONALD E. CZAJA, Primary Examiner

R. W. GRIFFIN, Assistant Examiner

U.S. Cl. X.R.

117—132, 161, 167, 168; 260—21, 22, 26, 33.2, 33.6, 40, 75, 834